(12) United States Patent
Cameron

(10) Patent No.: US 7,996,963 B2
(45) Date of Patent: Aug. 16, 2011

(54) CLIP SYSTEM FOR USE WITH TARPS AND OTHER FLEXIBLE SHEET MATERIAL

(75) Inventor: Robert W. Cameron, Bellingham, WA (US)

(73) Assignee: The Clip Joint LLC, Everson, WA (US)

( * ) Notice: Subject to any disclaimer, the term of this patent is extended or adjusted under 35 U.S.C. 154(b) by 788 days.

(21) Appl. No.: 11/975,223

(22) Filed: Oct. 17, 2007

(65) Prior Publication Data

US 2008/0104805 A1  May 8, 2008

Related U.S. Application Data

(60) Provisional application No. 60/852,460, filed on Oct. 17, 2006.

(51) Int. Cl.
*A44B 21/00* (2006.01)
*A41F 3/00* (2006.01)
*F16B 2/22* (2006.01)

(52) U.S. Cl. ............ 24/344; 248/229.16; 248/229.14; 248/229.24; 24/346; 24/499; 24/514; 24/519; 24/521; 24/535; 24/569

(58) Field of Classification Search .................. None
See application file for complete search history.

(56) References Cited

U.S. PATENT DOCUMENTS

| | | | | |
|---|---|---|---|---|
| 3,140,715 A | * | 7/1964 | Whitton, Jr. et al. | 606/210 |
| 3,653,389 A | * | 4/1972 | Shannon | 606/210 |
| 3,815,609 A | * | 6/1974 | Chester | 606/210 |
| 3,977,410 A | * | 8/1976 | Huston et al. | 606/210 |
| 4,212,305 A | * | 7/1980 | Lahay | 606/210 |
| 5,388,313 A | | 2/1995 | Cameron | |
| 5,507,460 A | * | 4/1996 | Schneider | 248/225.21 |
| 7,189,024 B2 | | 3/2007 | Cameron | |
| 7,308,739 B2 | | 12/2007 | Andersen et al. | |

* cited by examiner

*Primary Examiner* — Jack W. Lavinder
(74) *Attorney, Agent, or Firm* — Todd N. Hathaway

(57) ABSTRACT

A clip system for use with tarps and other flexible sheet material. The system includes first and second parts that are rotatably mounted so as to be free to twist independently of one another, in response to wind or other forces. The first part may be a clip body having jaws for gripping a tarp or other flexible sheet material, and the second part may be an attachment fitting for engaging an article separate from the tarp. There may be a series of different attachment fittings that are interchangeably mountable to the clip body, such as a hook, a screw-on fitting for attachment to a bottle that forms a weight, or a fitting for attachment of a strap or shock cord, for example. The two pieces may be joined by a male coupler and a female receptacle that receives the coupler in locking engagement. The male coupler may have a plurality of resiliently flexible legs with beveled end surfaces that flex inwardly to pass through the opening of the female receptacle. The legs then snap back outwardly so that undercut surfaces on the ends of the legs engage the receptacle to prevent separation of the pieces. The coupler and receptacle may further include cooperating annular surfaces that form a bearing interface for rotation of the parts.

22 Claims, 6 Drawing Sheets

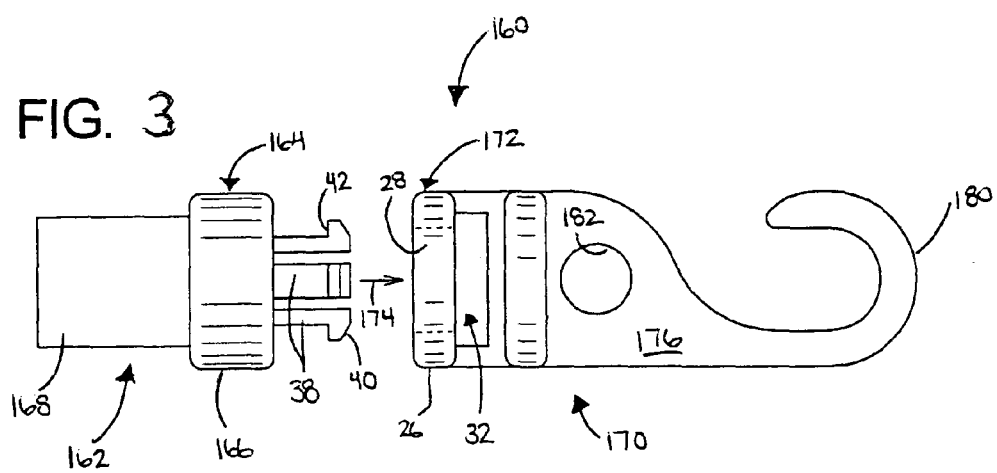

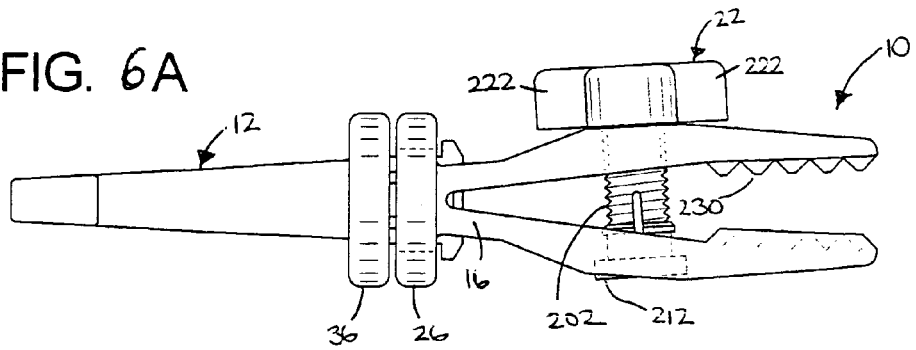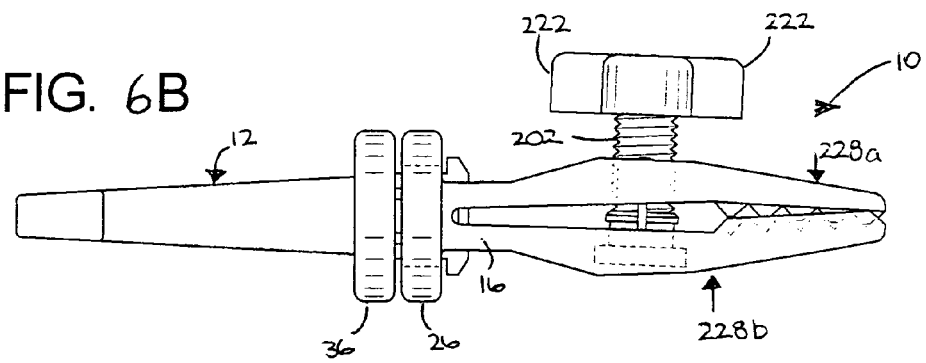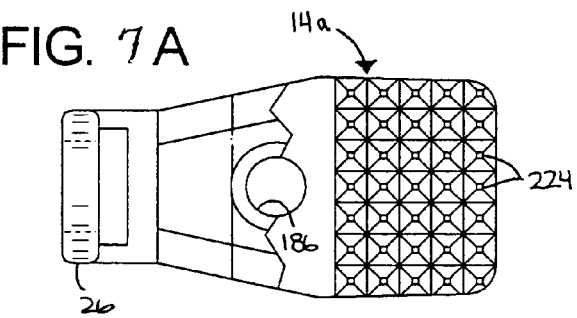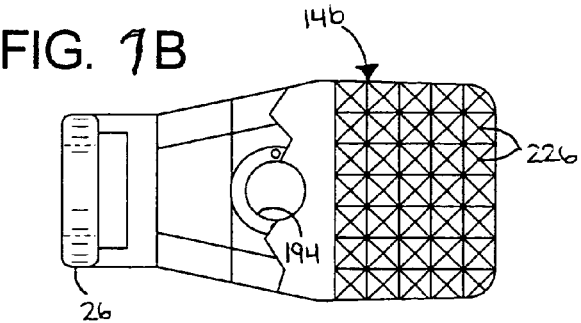

CLIP SYSTEM FOR USE WITH TARPS AND OTHER FLEXIBLE SHEET MATERIAL

RELATED APPLICATIONS

This application claims the benefit of U.S. Provisional Patent Application Ser. No. 60/852,460 filed on Oct. 17, 2006.

BACKGROUND a. Field of the Invention

The present invention relates generally to clips and similar gripping devices, and, more particularly, to a thumbscrew-operated clip for gripping the edges of tarps formed of plastic, cloth or other flexible sheet material.

b. Related Art

The problem of how to secure a tarp against environmental conditions is one of long standing. By their very nature, tarps are intended for use as protection against the weather and are therefore often subjected to high winds. This is true not only in stationary installations, but also where a tarp is used to cover a load on a moving vehicle, such as over a truck bed or rail car.

For years, many tarps have been provided with grommets along their edges to provide attachment points for ropes or other hold-down lines. This adds significantly to the cost of manufacturing the tarp, and unfortunately offers only a partial solution. For example, the grommets sometimes tear out of the edges of the tarp, which can render the tarp useless unless some other means can be found for attaching tie-down lines to its edges. Furthermore, the grommets are ordinarily provided only at widely spaced locations (e.g., at spacing of perhaps three feet or so), which makes it difficult or impossible to attach additional hold-down lines at other points where they may be needed in order to provide a tight fit or to resist wind forces.

Still further, some tarps are not provided with any grommets at all such as VISQUEEN™ and similar plastic sheeting, for example, which makes it extremely difficult to secure these in place. Users have resorted to the expedient of passing ropes or shock ("bungee") cords over the tops of the sheeting and/or weighting them with bricks, cinder blocks, pieces of wood and similar objects, which is neither secure nor practical in many circumstances.

A number of clip-like attachment devices have been proposed in prior art, principally for use with clothing and woven fabric material. For example, the traditional "suspender clip" uses a pair of metal jaws that are forced together by a clasp mechanism. The sharp, pointed jaws of these devices tend to cause excessive damage and wear to the fabric, and are simply incapable of firmly gripping plastic sheeting or other comparatively thin material without tearing or destroying it. This tendency is complicated by the fact that, due to the nature of the clasp mechanism, this type of clip can only exert a fixed amount of gripping force between the jaws, i.e., the grip cannot be adjusted to be either tighter or looser, as may be needed in particular instances or for use with certain materials. Furthermore, the metal "suspender clip" devices are subject to breakage and rapid wear, and are difficult to operate when wet and cold.

The locking clip disclosed in U.S. Pat. No. 5,388,313 (Cameron) addresses a number of these issues, and is highly effective for many applications. However, the toothed ramp mechanism of this device limits the clamping force to a predetermined range (i.e., between finite upper and lower limits), whereas in some instances it may be desirable to be able to exert a greater or lesser degree of clamping force against the material; for example, when used with certain very thin, slippery or wet materials, it may be desirable to exert a much higher degree of clamping force in order to establish a firmer grip on the material. Furthermore, the teeth on the device in the '313 patent are shown mainly as having the configuration of a series of transversely extending ridges or corrugations; again, while this configuration is very effective for use with many types of materials, other materials may have a tendency to either slip through or tear between the ridged teeth, particularly if forces are applied in a somewhat crosswise direction with respect to the jaws of the clip.

Other clip designs have provided another partial solution by utilizing a "screw together" clamping action, in which operation of a thumbscrew-like mechanism forces the jaws together. Some such clips have been formed of metal, and others have been made of molded plastic. While some of these clips have been proven reasonably effective, their designs have generally relied on the resilience of the material to return the jaws to an open position upon loosening of the screw mechanism: With metal clips, material fatigue leads to lessening or failure of the opening action over time; plastic clips, on the other hand, often exhibit a weak and less than positive opening action. Moreover, material and design factors typically limit the resilient opening action to a certain, maximum spread between the jaws, so that it is difficult or impossible to expand the opening further if necessary, e.g., in order to fit over several layers of material that have been bunched together.

Another, pronounced drawback of previous clips is that they are generally able to attach only one kind of article; in particular, most clips are capable of attachment to ropes or other type of cords. Ropes and cords are indeed perhaps the most common things that users use to attach to tarps, however, there are many other items and fixtures that may be beneficially attached to a tarp, particularly for certain relatively specialized purposes. A few clips have been designed with attachment features that allow them to be connected to more than one kind of cord (for example, for attachment to a bight of a rope and also to a hook on bungee cord), but not to other load-bearing/transmitting articles. Moreover, the cost of having to tool entire molds for use with different, sometimes specialized attachments can be economically prohibitive for the manufacturer.

Yet another difficulty with previous tarp clips has been their inability to accommodate twisting of the rope or fixture, which is often caused by wind and other environmental forces to which the ensemble is exposed. As a result, the clips tend to damage the material of the tarp by twisting and working against it, sometimes to the point of ripping out of the edge of the tarp.

Accordingly, there exists a need for an improved form of clip apparatus which permits an expanded range of grip forces to be exerted against sheet material between the jaws thereof, and which permits a comparatively high grip force to be exerted when desired. Furthermore, there exists a need for such a clip apparatus that is capable of accommodating tarps and materials having a variety of thicknesses. Still further, there exists a need for such a clip apparatus having an arrangement of teeth, which enables the apparatus to establish effective engagement with thin, slick or otherwise hard to grip sheet material. Still further, there exists a need for such a clip apparatus that will minimize damage to the fabric, plastic or other tarp material with which it is used. Still further, there exists a need for such a clip apparatus which can be adapted for attachment to a variety of load-bearing members and fixtures, including and in addition to ropes and cords. Still further, there exists a need for such a clip apparatus that can accommodate relative turning and twisting motion of a rope or other attachment, without twisting against and causing damage to the material of the tarp. Still further, there exists a need for such a clip apparatus which is reliable and durable, and which is economical to manufacture.

SUMMARY OF THE INVENTION

The present invention has solved the problems cited above, and is a clip system for use with tarps and other flexible sheet material.

In a broad aspect, the system comprises: (a) a clip body comprising first and second jaw members, and means for adjusting the gap between the jaw members so as to selectively grip and release a tarp therein; (b) at least one attachment fitting for engaging an article or fixture separate from the tarp; and (c) means for rotatingly mounting the attachment fitting to the clip body, so that the attachment fitting and clip body are free to twist independently of one another.

The at least one attachment fitting may comprise a plurality of different attachment fittings that are interchangeably mountable to the clip body. The means for mounting the at least one attachment fitting to the clip body may comprise a male coupler and a female receptacle that receives the coupler in locking engagement therewith. The male coupler may be formed on the attachment fitting and the female receptacle may be formed on the clip body.

The male coupler may comprise a boss having an annular bearing face, and a plurality of resiliently flexible legs extending substantially normal to the bearing face, the flexible legs each having an end portion comprising an outwardly sloped ramp portion and an undercut notch portion. The female receptacle may comprise a boss having an internal bore that reacts with the sloped ramps of the flexible legs of the male coupler so as to compress the legs inwardly as the end portions thereof are pressed into the bore, an opening on a rearward side of the boss that permits the legs to expand back outwardly after passing through the bore so that the undercut notches thereon form a locking engagement with the rearward side of the boss, and an annular bearing surface on a forward side of the boss that meets the annular bearing surface of the male coupler in face-to-face engagement so as to form a bearing interface for independent rotation of the attachment fitting and clip body.

The at least one attachment fitting may comprise a hook for attachment to a rope, cord or rod-shaped article. The at least one attachment fitting may also comprise a screw-on fitting for attachment to a bottle, jug or other container filled with liquid to provide a weight. The at least one attachment fitting may also comprise a fitting for attachment of a strap or shock cord.

The clip body may further comprise a live hinge that joins the first and second jaws at a base end of the body. The means for adjusting the gap between the first and second jaws may comprise a finger-operated screw adjustment mechanism. The finger-operated screw adjustment mechanism may comprise a screw member having a threaded shaft section in engagement with at least one of the jaws. The screw member may comprise a first end that is in non-threaded engagement with a first one of the jaws, a threaded shaft section that is in engagement with a second one of the jaws, and a second end that protrudes beyond the second jaw on a side opposite the first jaw. The screw adjustment mechanism may further comprise a finger-operable knob that is mounted to the projecting end of the screw member.

The clip body may further comprise a plurality of teeth formed on a first one of the jaws, and a plurality of cooperating recesses formed in the second one of the jaws into which the material of a tarp is pressed by the teeth so as to form a gripping engagement therewith. The plurality of teeth may comprise a plurality of corresponding, pyramidally-shaped teeth and the recesses may comprise a plurality of pyramidally-shaped sockets. The pyramidally-shaped teeth may comprise flattened tips so as to avoid piercing the material of the tarp. The teeth and sockets may be arranged in a series of rows that extend transversely across the first and second jaws.

These and other features and advantages of the present invention will be more fully appreciated from a reading of the following detail description with reference to the accompanying drawings.

BRIEF DESCRIPTION OF THE DRAWINGS

FIG. 3 is a plan view of an attachment fitting having a male mounting structure the same as the example attachment fittings of FIGS. 1A-2E, and of a hook member having a female mounting structure the same as the clip body of FIGS. 1A-1B, showing the manner in which the attachment fittings of the present invention can also be used with a variety of bodies having non-clip configurations;

FIGS. 6A-6B are side elevational views of the clip body of FIGS. 1A-1B, showing the manner in which the jaw members collapse towards one another as the screw adjustment mechanism is tightened, so that the coordinating gripping surfaces thereof come into generally parallel engagement so as to grasp the material of the tarp therein;

FIGS. 7A-7B are plan views of the tarp engagement surfaces of the clip body of FIGS. 6A-6B, showing the cooperating pyramidal teeth and sockets that form the gripping surfaces in greater detail;

DETAILED DESCRIPTION

Figure 1A:
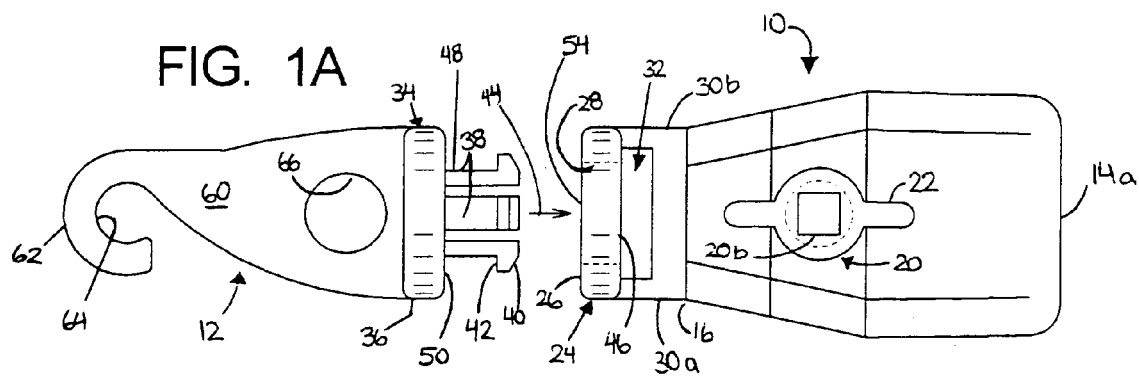
FIG. 1A is a plan view of a clip body and load attachment fitting, in accordance with the present invention.

Reference will now be made in detail to the preferred embodiments of the present invention, examples of which are illustrated in the accompanying drawings, wherein like reference numerals refer to like elements throughout. As used in this description and the appended claims, the term "tarp" includes all flexible sheet coverings made of material of any kind, whether of a woven or non-woven construction.

As will be described in greater detail below, the present invention provides a clip system in which a variety of attachment fittings can be used with a single form of clip body, for attachment to a variety of different loads, fixtures and load-bearing/transmitting members, in addition to and including ropes and cords. Moreover, the clip bodies and attachment fittings are free to rotate relative to one another, thus avoiding damage to the tarp or other sheet material in the event that the attachment fitting is subjected to twisting forces due to wind or other causes. Both components are economically and durably formed of a molded plastic material, such as glass filled nylon material.

Accordingly, FIG. 1 shows first and second clip components in accordance with the present invention, namely a clip body 10 and an attachment fitting 12. As will be described in greater detail below, the clip body 10 includes first and second jaws 14a, 14b (14a only being visible in FIG. 1A) that are joined at the base by a live hinge 16. The gap between the jaws is adjusted by a screw mechanism 20; as will be described in greater detail below, the screw adjustment mechanism of the preferred embodiment adjusts the opening between the jaws in both directions (i.e., both clamping together and spreading apart) in a positive manner, depending on the direction of rotation of the thumb operated knob 22.

The base of the clip body (at the end opposite the jaws 14a, 14b) includes a female receiver 24 formed by a ring-shaped boss 26 and axial bore 28. The boss is set away from the live hinge and main portion of the clip body, on legs 30a, 30b, with an opening 32 being formed on its rearward side. The attachment fitting 12, in turn, includes a male coupler 34 having a circular boss 36 that corresponds to that of the female receptacle 24. A plurality of resiliently flexible legs 38 extend longitudinally from the face the boss 36, in a circular array that is sized to be received within the bore 28 of the female receptacle; the coupler of the illustrated embodiment includes four of the flexible legs, which has been found to be an eminently suitable number, however, it will be understood that more or fewer legs may be used in some embodiments, depending on design factors. As can be seen, the distal ends of the legs include outwardly and rearwardly sloped ramp portions 40, that extend over undercut notches 42 on the outer sides of the legs.

The circular array of legs 38 surrounds an open center, so that the legs can flex inwardly without obstruction. The ramps 40 on the ends of the legs thus form a taper that reacts against the entrance to bore 28 so as to flex the legs inwardly towards one another, in response to the male coupler being forced into the female receptacle in a direction indicated by arrow 44. Upon passing through the bore so that the notches 42 reach the opening 32, the legs resiliently expand back outwardly (radially) so as to position the notches against the rearward face 46 of boss 26, thus locking the clip body and attachment fitting together as an assembly. Moreover, the tapered ramps on the legs produce a self-centering action so that assembly requires only a quick motion of the two pieces in a longitudinal direction as shown in FIG. 1A, enhancing both economy and ease of use.

The main portion 48 of the legs (the portions between the notches 42 and the forward face 50 of the circular boss 36) is sized just slightly longer than the thickness of the ring-shaped boss 24, so that when the legs snap back out to lock the pieces together, the forward face 50 of boss 36 is retained in closely-spaced parallel relationship with the corresponding face 52 on the other boss 24. The faces 50, 54, 46, and the undercut notches 42, thus cooperate to form a series of generally annular, relatively broad bearing surfaces, that provide the clip assembly with structural integrity and resistance to bending, while at the same time permitting the attachment fitting and clip body to rotate relative to one another about the longitudinal axis of the assembly, as indicated by arrow 56 in FIG. 1B. This rotating action prevents transmission of twisting forces from the attachment fitting to the clip body, thus avoiding the latter twisting and working against the material of the tarp.

The center plug 300 has a diameter sized to closely match the diameter of the opening between the ends of the circular array of legs, with the result that when the legs are compressed inwardly their ends define an inside diameter smaller than that of the center plug. Thus, as the two components 10, 12 are pressed together in the direction indicated by arrow 308 in FIG. 11A, the ends of the legs pass through bore 28 and come into contact with the center plug 300. Continued force then causes the bridge piece 306 to deflect resiliently, in a manner similar to a spring, so that the center plug is pushed ahead of the legs, in a direction towards the jaws of the clip body. With further movement the undercut notches 42 of the legs reach the opposite side of boss 26, so that the legs are released to expand outwardly. As this happens the bridge piece 36 simultaneously biases the center plug 300 back towards its original position, so that the plug becomes nested within the central opening of the circular array of legs, as shown in FIG. 11B. In this position, the center plug prevents any subsequent inward movement/deflection of the legs, thus obviating the possibility of the components being accidentally separated by tension or a bending action.

It will be understood that other structures may also be used for enhanced engagement between the components, such as angled (or hook-shaped) undercuts on the ends of the legs that engage a cooperatingly tapered or beveled collar or ring about the perimeter opening 32.

Figure 1B:
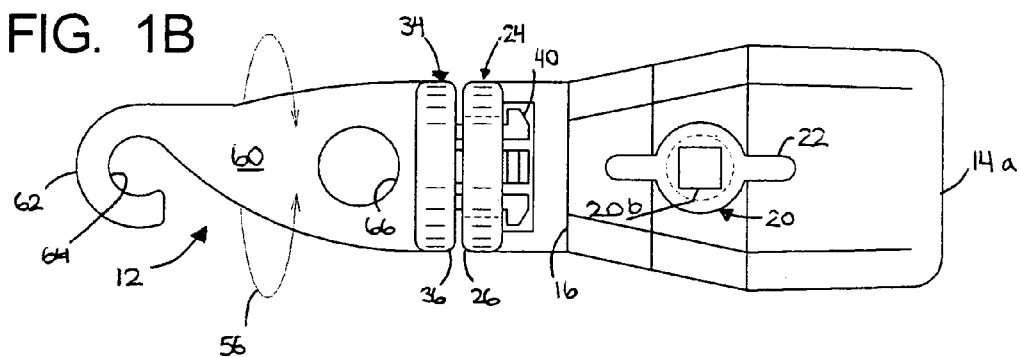
FIG. 1B is a second plan view of the clip body and load attachment fitting of FIG. 1A, showing the load attachment fitting joined to the clip body to form a complete clip assembly, and also showing the manner in the load attachment fitting is free to rotate relative to the clip body without transmitting twisting forces to the latter.
Figure 2A:
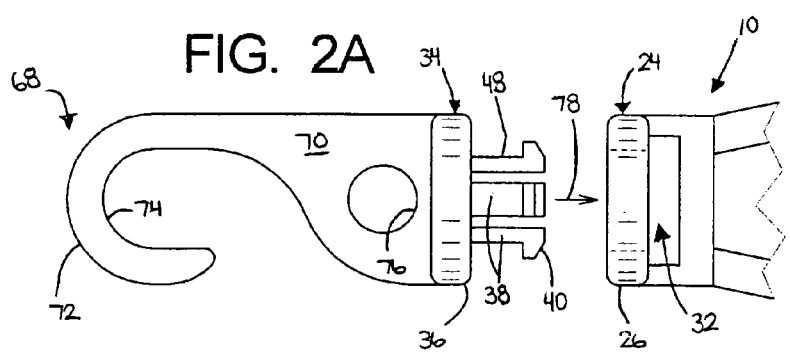
FIG. 2A is a plan view similar to FIG. 1A, but showing the clip body only in part view, illustrating the manner in which a second load attachment fitting having an enlarged hook can be mounted to the clip body in place of the first load attachment fitting that is shown in FIGS. 1A-1B.

In the embodiment that is illustrated in FIGS. 1A-1B, the attachment fitting 12 includes a body 60 having a hook portion 62 formed on its end opposite the male coupling 34. The hook defines an opening 64 for receiving a rope or other cord; the assembly may therefore be used, for example, to attach a relatively small rope or cord to a tarp. FIG. 2A, in turn, shows a second attachment fitting 68 having a body 70 with a relatively larger clip portion 72 at its end, that defines an opening 74 for receiving a larger rope or article, such as a branch or rod. The body also includes a hole 76, e.g., for receiving the hook of a sock cord or the like. As can be seen, the second attachment fitting 68 includes a male coupling 34, having a boss 36 and legs 38, that is identical to the male coupling of the first attachment fitting 60 described above. The second attachment fitting 68 therefore mounts to an identical clip body 10 in the same manner as previously described, i.e., with a simple longitudinal insertion of the male coupler into the female receiver, as indicated by arrow 78 in FIG. 2A.

Figure 2B:
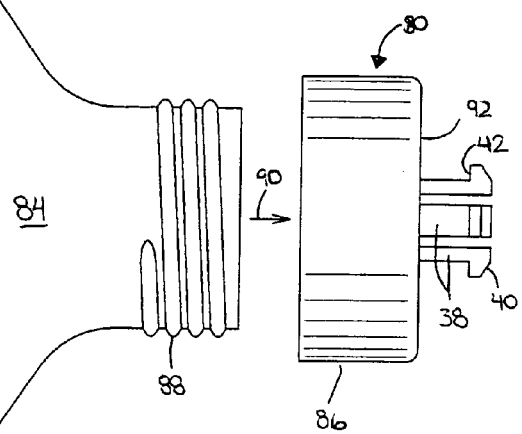
FIG. 2B is a plan view of a third example attachment fitting that can be used with the clip body of FIGS. 1A-1B, namely a screw-on cap for a comparatively large bottle that can be filled with water or other liquid to form a weight for the edge of a tarp.
Figure 2C:
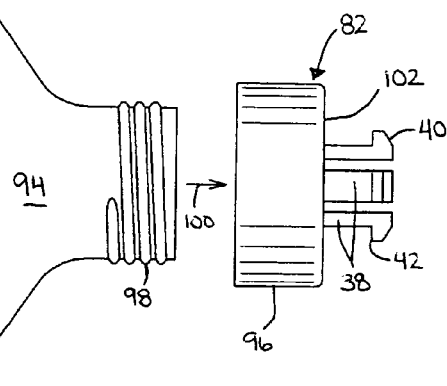
FIG. 2C is a plan view of a fourth example attachment fitting that can be used with the clip body of FIGS. 1A-1B, namely a screw-on cap for a relatively small bottle that can likewise be filled with water or other liquid to form a weight.
Figure 2D:
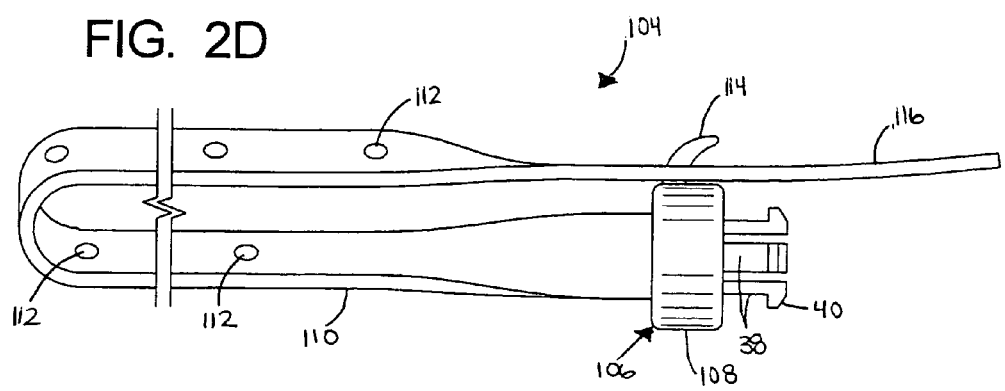
FIG. 2D is a plan view of a fifth example attachment fitting that can be used with the clip body of FIGS. 1A-1B, namely a rigid base and elongate strap having a plurality of openings that enable it to be looped back and attached to a projecting hook on the base.

FIGS. 2B-2D show additional examples or attachment fitting that are mountable to identical clip bodies in the same manner; it will be understood that some embodiments may have attachment fittings with differing or additional configurations.

FIGS. 2B and 2C show attachment fittings 80, 82 that serve to connect bottles or similar containers to the clip bodies, so that the bottles can serve as weights when filled. The first fitting 80 in FIG. 2B is configured for attachment to a relatively large container, e.g., a one gallon jug 84. The attachment fitting includes a cylindrical boss 86 having internal threads that are sized and configured to engage the threads 88 on the neck of the jug, in order that they can be connected as indicated by arrow 90. Flexible legs 38 identical to those described above protrude from the opposite side, and are surrounded by an annular surface 92 that corresponds to the forward surface 50 of the boss 36 described above, and that likewise cooperates with the surface 54 of the clip body to form a bearing surface. The attachment fitting 82 shown in FIG. 2C is substantially the same as that in FIG. 2B, except for being sized for attachment to a smaller bottle, such as a two liter soda bottle 94. Accordingly, the attachment fitting also includes an internally threaded boss 96 that mounts to the cap threads 98 of the bottle, as indicated by arrow 100, and an annular forward surface 102 that surrounds the array of flexible legs 38.

FIG. 2D shows an attachment fitting 104, with a male coupler 106 formed by a cylindrical boss 108 and legs 38 similar to those described above, to which an elongate strap member 110 is mounted. The strap member includes a plurality of longitudinally-spaced holes 112, similar to those of a belt, which are sized to receive a curved hook 114 that projects from the perimeter of the connector boss 108. The strap member 110 is preferably formed of an elastic material, such as rubber, for example. The strap can therefore be wrapped around an article or articles (e.g., a bundle of sticks), and its free end 116 of the strap then stretched taut so that the hook 114 can be passed through one of the holes 112 to secure the article or articles to the fitting.

FIG. 3 shows an assembly 160 in which there is an attachment fitting 162 having a male coupler 164 formed by boss 166 and legs 38, in the manner previously described. In this example, the boss is attached to an elongate strap 168, however, it will be understood that the attachment fitting may have other configurations, including those described above.

In the embodiment shown in FIG. 3, the attachment fitting connects to a hook member 170, rather than to a clip body. The hook member, similar to the clip bodies, includes a female receiver 172 having a boss 26, bore 28 and opening 32 that are identical to those described above, so that the coupler and receptacle can be joined in the same manner, i.e., by pressing them together in the direction indicated by arrow 174. In this instance, however, the receptacle 172 is formed at the base of a body 176 having a hook 180 at the other end and an opening 182 (similar to the hook member of FIG. 2A), instead of a clip. FIG. 3 thus demonstrates the versatility of the system of the present invention, in which the components and connectors provided for the clip assemblies can also be used with other types of attachments.

As noted above, a wide range of attachment fittings may be provided for use with the clip bodies in the system of the present invention, in addition to the examples described above. Moreover, it will be understood that the coupling mechanism may vary somewhat depending on design factors; for example, in some embodiments the male/female couplers may be reversed between the clip bodies and the attachment fittings, the number and shape of the legs may differ somewhat, the opening 32 may be an enclosed cavity, and so on.

Figure 4A:
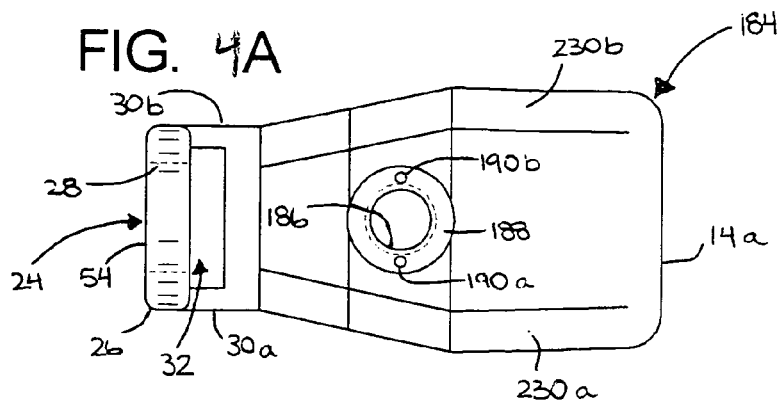
FIG. 4A is a top plan view of the clip body of FIGS. 1A-1B, with the screw adjustment mechanism being removed, showing the structure thereof in greater detail.
Figure 4B:
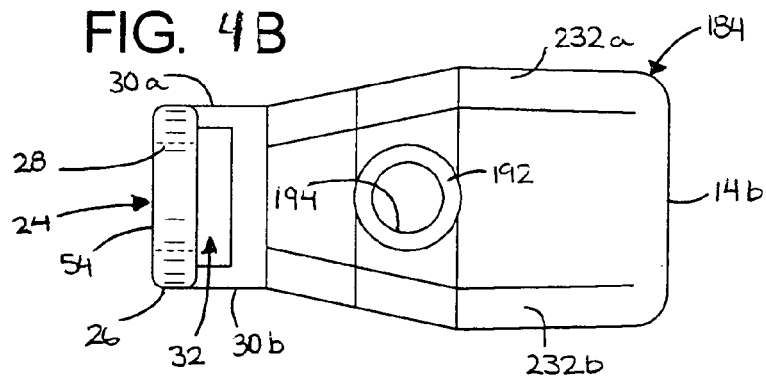
FIG. 4B is a bottom plan view of the clip body of FIG. 4A.
Figure 5:
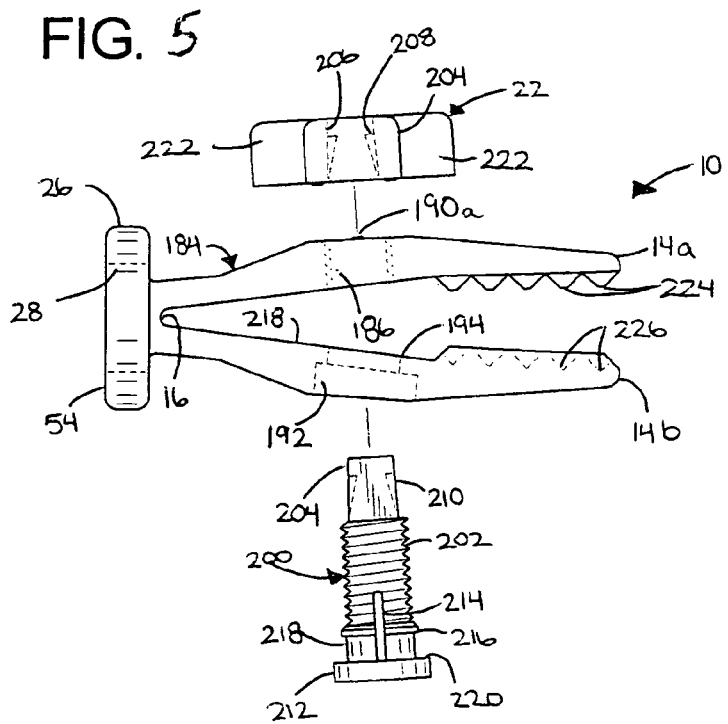
FIG. 5 is an elevational, exploded view of the clip body of FIGS. 1A-1B, showing the manner in which the components thereof are assembled to form the body.

FIGS. 4A-4B and 5 show the construction of the clip body 10 in greater detail.

As can be seen in FIGS. 4A-4B, the upper and lower jaws 14a, 14b, live hinge 16, and receptacle 24 are all formed as integral features of a single, molded structure 184, which (as noted above) is suitably formed of glass reinforced nylon or other resiliently flexible plastic material having good memory and durability characteristics.

The outer surface of the upper jaw 14a (for ease of discussion, the jaw towards the finger-operated nut of the screw adjustment mechanism will be referred to as the "upper jaws", but it will be understood that the actual orientation and relationship of the parts may be reversed or otherwise differ from what is shown) includes an opening into an internally threaded bore 186 that is surrounded by a flat, annular bearing surface 188. First and second small pegs or teats 190a, 190b protrude upwardly a short distance above the annular surface, on opposite sides of the bore 186.

The lower jaw 14b, in turn, includes a recessed, annular socket 192 that surrounds a second bore 194. As can be seen in FIG. 5, bore 194 is coaxially aligned with the bore 186 in the upper jaw 14a. Screw member 200 is inserted through the unthreaded bore 194 of the lower jaw and then threaded into the upper bore 186, so that the threaded shaft section 202 of The screw member forms a cooperating engagement with the latter. A square shaft end 203 of the screw member protrudes above the upper surface of jaw 14a, and is received in a cooperating, square bore 206 in the hub 204 of the finger operated knob member 22. As the knob member is pressed onto the shaft end, inwardly-projecting teeth 208 within bore 206 engage correspondingly shaped notches 210 in the shaft end so as to lock the two pieces together.

At its lower end, the enlarged, circular head 212 of the screw member is received in the socket 192 of jaw 14b. As can be seen in FIG. 5, the head end of the shaft of the screw is provided with a transverse, lengthwise slit opening 214, that allows the sides of the shaft to flex inwardly in this area, and a raised, annular ridge 216 formed at the lower end of the threads. The distance between the ridge 216 and the head 212 of the screw member is slightly greater than the thickness of the thin material between the end wall of the recess 192 and the inside surface 218 of the lower jaw 14b. The screw member is thus installed by pressing the head 212 upwardly into the socket 192, so that the sides of the screw flex inwardly to allow the ridge 216 to pass through bore 194. Upon reaching the inside surface 218 of the lower jaw, the sides of the screw expand back outwardly so that the longitudinal position of the screw member is locked in relationship to the jaw. The shaft section 218 that resides in bore 194 is non-threaded, so as to rotate smoothly and freely within the bore; the annular undersurface 220 of the screw head 212, in turn, bears against the bottom wall of recess 192 to form a horizontal bearing surface.

The opening between the jaws is thus adjusted by turning knob 22 by hand, with the fingers pressing against the wings or ears 222 on the knob. Turning the knob a first direction (e.g., clockwise) draws the jaws together: The threaded shaft second 202 cooperates with the internally threaded bore of the upper jaw to shorten the distance between the latter and the lower jaw, which is retained by the head 212 of the screw. Turning the knob the opposite direction spreads the jaws apart; as the length of the screw below the upper jaw increases, the ridge 216 reacts against the inside surface of the lower jaw so as to widen the opening in a positive manner and as far as needed.

When the jaws are being tightened, the teeth 224 on the upper jaw enter cooperating depressions 226 in the lower jaw. As can be seen in FIG. 6A, contact first occurs at the tips of the jaws, so that the distal rows of teeth and sockets are the first to engage the tarp. Further tightening of the screw mechanism causes the middle portions of the jaws (the portions between the teeth and the live hinge 16) to collapse together resiliently, so that the remaining rows of teeth/sockets engage sequentially and the jaws flatten out to reach a more or less parallel orientation, as indicated by arrows 228a, 228b in FIG. 6B. Upon loosening of the screw mechanism, the jaws bend apart to release the teeth/sockets in a reverse sequence, from the back towards the tips of the jaws. The outer surfaces of jaws are provided with lengthwise strengthening ribs 230a, 230b and 232a, 232b (see FIGS. 4A-4B) along their edges, which ensure the two jaws collapse and spread apart resiliently as described.

The sequential engagement of the jaws provides several advantages; in particular the ability to exert a strong, evenly distributed gripping force against materials of varying thicknesses, e.g., whether a single layer of a tarp or several layers folded over or bunched together. By comparison, conventional jaws having a fixed angle tend to spread apart towards their tips if the material is overly thick, while with thinner materials they tend to spread apart towards the base.

Furthermore, the teeth and depressions 224, 226, as shown in FIGS. 7A-7B, have profiles that establish a strong, non-slip grip against the tarp without damaging its material. As can be seen, the teeth are substantially pyramidal in shape, with four angled sides meeting at pronounced corners, while the depressions have a corresponding pyramidal configuration. When the material of the tarp is pressed into the depressions by the teeth, the cooperating edges and flats bend the material through multiple angles so as to obviate any possibility of slippage, without cutting into or otherwise damaging the fibers or other material of the tarp. Moreover, as can be seen, the teeth are provided with flattened rather than pointed tips 230, obviating any possibility of puncturing the material of the tarp.

Figure 8:
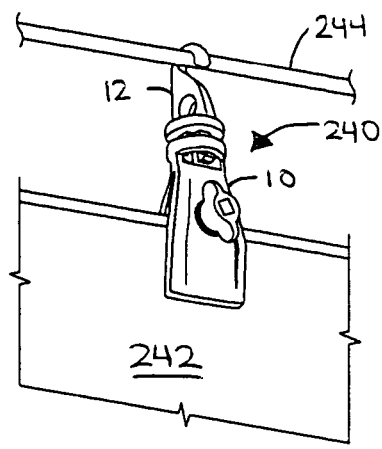
FIG. 8 is an elevational, environmental view of an example use of the clip assembly of FIGS. 1A-1B, namely to suspend a tarp from a rope.
Figure 9:
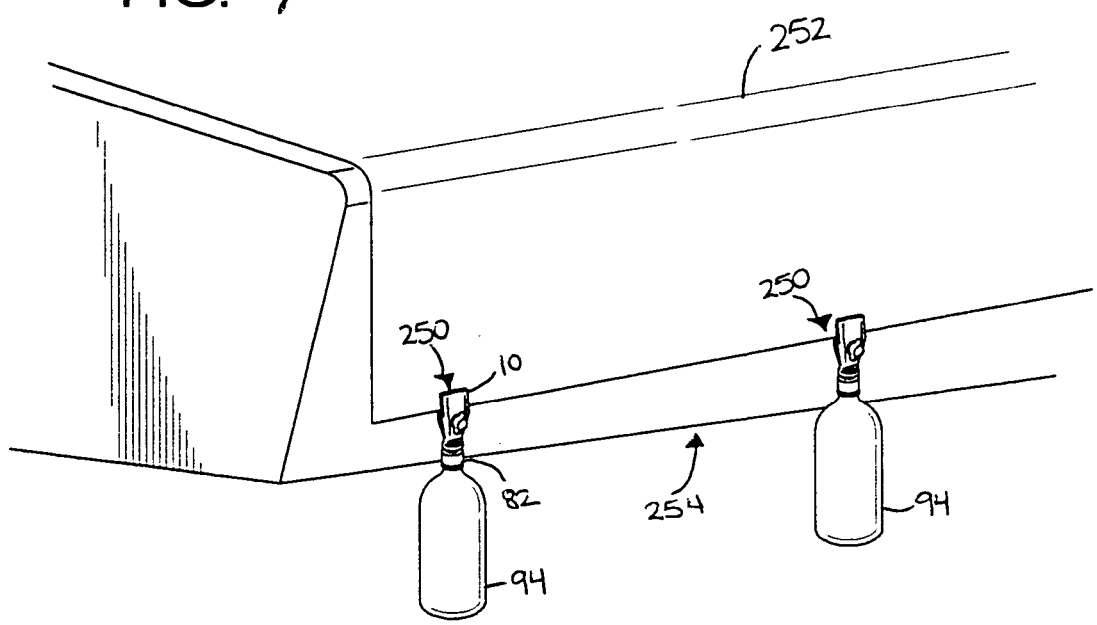
FIG. 9 is an environmental view of an example use of the clip assembly made up of the clip body with the attachment fitting of FIG. 2C, namely to suspend a plurality of filled bottles as weights about the hem of a cover over a boat.

FIGS. 8-9 illustrate two exemplary uses of hook assemblies in accordance with the system of the present invention. FIG. 8 shows use of a clip assembly 240 made up of the clip body 10 and attachment fitting 12 of FIGS. 1A-1B. In this example, the jaws of the clip body grip the edge of a tarp 242, while the hook of the attachment fitting is placed over a rope 244 so as to suspend the tarp from the latter. FIG. 9, in turn, shows exemplary use of a series of clip assemblies 250 made up of the clip bodies 10 of FIGS. 1A-1B and the bottle attachment fittings of FIG. 2C, to weight the hem of a cover 252 over a boat 254 using filled soda bottles 94. Again, it will be understood that virtually unlimited additional applications exist, given the wide range of attachment fittings that may be used.

It will be understood that other embodiments of the present invention may employ jaw portions, teeth, thumbscrew mechanisms or other components that vary somewhat from the preferred embodiments shown and described herein. It is therefore to be recognized that various alterations, modifications and/or additions may be introduced into the constructions and arrangements of parts described above without departing from the spirit or ambit of the present invention as defined by the appended claims.

What is claimed is:

1. A clip system for use with flexible sheet material, said clip system comprising:
   a clip body comprising:
      first and second jaw members at a first end of said clip body;
      a live hinge that joins said first and second jaw members at a base end of said body;
      means for adjusting a gap between said jaw members so as to selectively grip and release said sheet material therein, said means for adjusting said gap between said first and second jaw members comprising:
         a finger-operated screw adjustment mechanism comprising a screw member having a threaded shaft section in engagement with at least one of said jaw members, said screw member spanning said jaw members at a location intermediate distal ends of said jaw members and said live hinge at said base end of said body;
      said first and second jaw members being angled together distally so that in response to tightening of said screw member said jaw members first come into contact at distal tips thereof, and being formed of resiliently flexible material so that in response to continued tightening of said screw member after first coming into contact at said distal tips said angled jaw members collapse resiliently so as to flatten out into a substantially parallel orientation against one another; and
      a first coupling portion at a second, generally opposite end of said clip body; and
   at least one attachment fitting comprising:
      a second coupling portion at a first, generally opposite end of said attachment fitting; and
      an attachment portion at a second, generally opposite end of said attachment fitting for engaging an article separate from said sheet material;
   said first and second coupling portions rotatingly mounting said attachment fitting to said clip body so that said attachment fitting and clip body are free to twist independently of one another about an axis of rotation aligned generally from said first end of said clip body to said second end of said attachment fitting.

2. The clip system of claim 1, wherein said at least one attachment fitting comprises:
   a plurality of different attachment fittings that are interchangeably mountable to said clip body.

3. The clip system of claim 1, wherein said first and second coupling portions comprise:
   a male coupler; and
   a female receptacle that receives said coupler in locking engagement therewith.

4. The clip system of claim 3, wherein said male coupler is formed on said attachment fitting, and said female receptacle is formed on said clip body.

5. The clip system of claim 3, wherein said male coupler comprises:
   a boss having an annular bearing face; and
   a plurality of resiliently flexible legs that extend substantially normal to said bearing face, said flexible legs each having an end portion comprising:
      an outwardly sloped ramp portion; and
      an undercut notch portion.

6. The clip system of claim 5, wherein said female receptacle comprises:
   a boss having an internal bore that reacts with the sloped ramps of the flexible legs of the male coupler so as to compress said legs inwardly as said end portions thereof are pressed into said bore;
   an opening on a rearward side of said boss that permits said legs to expand back outwardly after passing through said bore so that said undercut notches thereon form a locking engagement with said rearward side of said boss; and
   an annular bearing surface on a forward side of said boss that meets said annular bearing surface of said male coupler in face-to-face engagement so as to form a bearing interface for independent rotation of the attachment fitting and clip body.

7. The clip system of claim 1, wherein said at least one attachment fitting comprises:
   a hook for attachment to a rope or similar article.

8. The clip system of claim 1, wherein said at lest one attachment fitting comprises:
   a screw-on fitting for attachment to a bottle or other container filled with liquid to provide a weight.

9. The clip system of claim 1, wherein said at least one attachment fitting comprises:
   a fitting for attachment of an elastic cord.

10. The clip system of claim 1, wherein said screw member comprises:
    a first end that is in non-threaded engagement with a first one of said jaw members, said threaded shaft section of said screw member being in engagement with a second one of said jaw members; and
    a second end that protrudes beyond said second jaw member on an opposite side of said first jaw member.

11. The clip system of claim 10, wherein said screw adjustment mechanism further comprises:
    a finger-operable knob that is mounted to said projecting end of said screw member.

12. The clip system of claim 1, wherein said clip body further comprises:
    a plurality of teeth formed on a first of said jaws; and
    a plurality of cooperating recesses formed in a second of said jaws, into which said flexible sheet material is pressed by said teeth so as to form a gripping engagement therewith.

13. The clip system of claim 12, wherein said teeth comprise a plurality of pyramidally-shaped teeth, and said recesses comprise a plurality of cooperating, pyramidally-shaped sockets.

14. The clip system of claim 13, wherein said pyramidally-shaped teeth have flattened tips so as to avoid piercing said flexible sheet material.

15. The clip system of claim 13, wherein said teeth and sockets are arranged in a series of rows that extend transversely across said first and second jaws of said clip body.

16. The clip assembly of claim 1, wherein said first and second jaw members further comprise:
    a plurality of cooperating teeth and sockets formed on distal portions of said jaw members, so that in response to said faces of said jaw members collapsing resiliently so as to flatten out into said substantially parallel orientation a progressively greater number of said teeth are forced into said sockets so as to increase an amount of grip exerted by said jaw members.

17. A clip system for use with flexible sheet material, said clip system comprising:
    a clip body comprising:
       first and second jaw members at a first end of said clip body;
       a live hinge that joins said first and second jaw members at a base end of said body; and
       means for adjusting a gap between said jaw members so as to selectively grip and release said sheet material therein, said means for adjusting said gap between said first and second jaw members comprising:
          a finger-operated screw adjustment mechanism comprising a screw member having a threaded shaft section in engagement with at least one of said jaw members, said screw member spanning said jaw members at a location intermediate distal ends of said jaw members and said live hinge at said base end of said body;
       said first and second jaw members being angled together distally so that in response to tightening of said screw member said jaw members first come into contact at distal tips thereof, and being formed of resiliently flexible material so that in response to continued tightening of said screw member after first coming into contact at said distal tips said angled jaw members collapse resiliently so as to flatten out into a substantially parallel orientation against one another.

18. The clip system of claim 17, wherein said clip body further comprises:
    a plurality of teeth formed on a first of said jaws; and
    a plurality of cooperating recesses formed in a second of said jaws, into which said flexible sheet material is pressed by said teeth so as to form a gripping engagement therewith.

19. The clip system of claim 18, wherein said teeth comprise a plurality of pyramidally-shaped teeth, and said recesses comprise a plurality of cooperating, pyramidally-shaped sockets.

20. The clip system of claim 19, wherein said pyramidally-shaped teeth have flattened tips so as to avoid piercing said flexible sheet material.

21. The clip system of claim 19, wherein said teeth and sockets are arranged in a series of rows that extend transversely across said first and second jaws of said clip body.

22. The clip assembly of claim 17, wherein said first and second jaw members further comprise:
    a plurality of cooperating teeth and sockets formed on distal portions of said jaw members, so that in response to said faces of said jaw members collapsing resiliently so as to flatten out into said substantially parallel orientation a progressively greater number of said teeth are forced into said sockets so as to increase an amount of grip exerted by said jaw members.

* * * * *